(12) United States Patent
Fischer et al.

(10) Patent No.: US 6,469,502 B2
(45) Date of Patent: Oct. 22, 2002

(54) MECHANICAL SHAFT WITH INTEGRATED MAGNET ARRANGEMENT

(75) Inventors: Roland Fischer, Nidderau (DE); Klaus Hoffman, Seeheim-Jugenheim (DE)

(73) Assignee: Daimler Chrysler AG, Stuttgart (DE)

( * ) Notice: Subject to any disclaimer, the term of this patent is extended or adjusted under 35 U.S.C. 154(b) by 58 days.

(21) Appl. No.: 09/788,350

(22) Filed: Feb. 21, 2001

(65) Prior Publication Data

US 2001/0015642 A1 Aug. 23, 2001

(30) Foreign Application Priority Data

Feb. 22, 2000 (DE) .......................................... 100 07 968

(51) Int. Cl.$^7$ ................................................. G01B 7/30
(52) U.S. Cl. ................................ 324/207.2; 324/207.25
(58) Field of Search .......................... 324/207.2, 207.21, 324/207.24, 207.25, 207.26; 338/32 R, 32 H

(56) References Cited

U.S. PATENT DOCUMENTS 4,392,375 A * 7/1983 Eguchi et al. ............... 137/554
4,810,967 A   3/1989 Yokoyama et al.
5,198,763 A * 3/1993 Konishi .................. 324/207.25

FOREIGN PATENT DOCUMENTS

DE          410 14885 A1    11/1990

* cited by examiner

Primary Examiner—Jay Patidar
(74) Attorney, Agent, or Firm—Venable; Nornam N. Kunitz

(57) ABSTRACT

Mechanical shaft (1) with integrated magnet arrangement (8, 9) for detecting the angle of rotation of the shaft (1) around its axis of rotation, with a) a box-shaped recess (3) in the face (2) of the mechanical shaft (1), b) an oblong permanent magnet (9) which is arranged on the bottom (5) of the recess (3), c) two pole shoes (8) which are arranged on opposite sides (4) of the box-shaped recess (3) at the poles of the oblong permanent magnet (9) and have a positive flush fit with the face (2) of the mechanical shaft (1), d) in which the two pole shoes (8) form a U-shaped magnet arrangement (8, 9) with the oblong permanent magnet (9), in which the pole shoes (8) form the two legs and the oblong permanent magnet (9) forms the yoke of the U-shaped magnet arrangement, so that a free space 3a remains in the recess (3) between the pole shoes (8), in which a uniform, homogeneous magnetic field (H) with parallel lines of force prevails.

10 Claims, 2 Drawing Sheets

MECHANICAL SHAFT WITH INTEGRATED MAGNET ARRANGEMENT

BACKGROUND OF THE INVENTION

A magnet arrangement for detecting the angle of rotation of a mechanical shaft is known, for example, from the patent U.S. Pat. No. 4,810,967. In this case, the magnet arrangement comprises a magnetic ring which is slipped onto a shaft. The magnetic ring is provided with a magnetic coding around its periphery which is read by at least one magnetic field sensor. Because the magnetic ring with its magnetic coding is slipped onto the shaft, it makes the cylinder jacket surface of the shaft appear bigger and effects a considerable increase in the local diameter of the component comprised of shaft and magnetic ring at the location of the magnetic ring. Such a shaft can only be fitted into arrangements in which there is a sufficiently large space available to house the additional magnetic ring.

A further disadvantage of a shaft with a magnet arrangement such as in U.S. Pat. No. 4,810,967 lies in the expensive coding of the magnetic ring around the periphery. In this case, the attainable angular resolution depends upon the fineness of the coding and the number of individual magnetized zones. The greater the number of magnetized zones, the greater the angular resolution. However, a large number of magnetized zones means that the ring has a large circumference with the previously mentioned design disadvantages. Apart from that, such magnetic scale codings require a great deal of time and money.

A further disadvantage of mechanical shafts with scale codings attached to their cylinder jacket surfaces is that the cylinder jacket surface can no longer transmit any power at the location of the scale coding. This means a substantial design limitation if, for example, the cylinder jacket surface of the shaft is to be equipped with a gear for power transmission.

SUMMARY OF THE INVENTION

The object of the invention is therefore to propose a mechanical shaft with an integrated magnet arrangement which, together with a magnetic field sensor, enables the angle of rotation position of the shaft to be detected. In so doing, the magnet arrangement should not require any additional structural space in order to fit the mechanical shaft into an arrangement and its design should be kept as simple as possible.

In accordance with the invention, this task is solved by the features of the independent claim. Further advantageous embodiments are contained in the subclaims.

The solution is achieved by fitting a permanent magnet, a non-magnetic screening and at least two pole shoes into a recess in the face of the shaft end. The magnetic field of the permanent magnet is shaped by a non-magnetic screening and by a special arrangement of additional pole shoes. The non-magnetic screening encloses the permanent magnet and the pole shoes like a box with four side walls and a bottom plate, and screens the magnetic field of the permanent magnet from the material of the mechanical shaft. If the material of the mechanical shaft is made of a non-magnetic material then there is no need for additional screening. In this case, the magnet arrangement of permanent magnet and pole shoes is fitted directly into the recess in the face of the shaft. Together with the oblong permanent magnet, the pole shoes form a U-shaped arrangement, in which the pole shoes form the two legs of this U-shaped arrangement and the linear permanent magnet the connecting yoke. In this way, a uniformly homogeneous magnetic field is created between the two free legs of the pole shoes with very good parallel alignment of the field lines. A direction-sensitive magnetic field sensor securely fitted between the free legs of the pole shoes produces, in the case of a rotational movement of the mechanical shaft and the thereby inevitably linked change in the direction of the magnetic field between the legs of the pole shoes, a sinusoidal signal whose value is a measure for the angle of rotation of the shaft corresponding to the trigonometrical functions.

The following principal advantages are achieved through the invention:

The mechanical shaft with an integrated magnet arrangement according to the invention makes a mechanical shaft available whose angle of rotation can be detected without contact. The mechanical shaft according to the invention can be particularly advantageously used where there is no structural space available for an additional measuring arrangement outside the shaft. This makes the mechanical shaft according to the invention particularly suitable as, for example, a component of the rotor of an electric motor or as a component of a toothed wheel gear. Conventional magnetic scale arrangements on the cylinder jacket surface of a drive shaft would normally require a free cylinder jacket surface here, so that the shaft would have to be lengthened to accommodate the scale arrangement in comparison to a drive shaft without scale arrangements.

The design of the magnet arrangement for the mechanical shaft according to the invention can be kept very simple and very small. This also enables the recess for accommodating the magnet arrangement to be kept very small. This is particularly advantageous if the magnet arrangement is recessed into the faces of drive shafts. As a rule, the recess can be kept small in comparison to the dimensions of a drive shaft of a toothed wheel drive or a powerful electric motor, so that the structural mechanical strength properties of the drive shaft are hardly affected by the recess.

BRIEF DESCRIPTION OF THE DRAWINGS

Embodiments of the invention are described in more detail in the following and illustrated by drawings. They show.

BRIEF DESCRIPTION OF THE PREFERRED EMBODIMENTS

Figure 1:
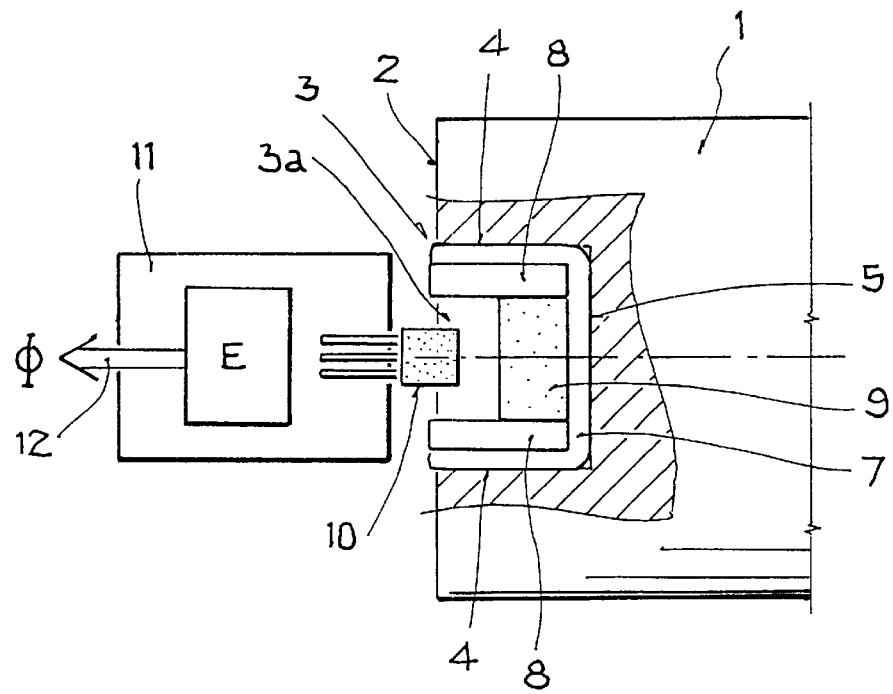
FIG. 1 a diagrammatic sectional drawing of the mechanical shaft according to the invention with an integrated magnet arrangement and magnetic field sensor FIG. 2 a comparison of the actually measured sensor signal with the ideal, theoretically expected signal as a function of the angle of rotation of the mechanical shaft FIG. 3 diagrammatic side view and plan view sectional drawings of the mechanical shaft according to the invention with an indication of the course of the magnetic field lines.

FIG. 1 shows a diagrammatic sectional drawing of the mechanical shaft according to the invention with an integrated magnet arrangement and magnetic field sensor. A recess 3 is made in the face 2 of a mechanical shaft 1 which, in the embodiment, is made of a ferromagnetic, commercially available constructional steel. The recess is preferably box-like and of an oblong shape. The dimensions of the recess typically range from 5 to 20 mm, preferably ranging from 10 to 15 mm for the length of the recess, from 2 to 10 mm, preferably ranging from 4 to 7 mm for the width of the recess, from 5 to 15 mm, preferably ranging from 7 to 12 mm for the depth of the recess.

The recess is completely lined with sheet copper 7 on the sides 4 and the bottom 5. Two rectangular pole shoes 8 are arranged on the upper and lower sides of the lined recess. The pole shoes have a positive flush fit with the surface of the face of the shaft end and extend to the bottom of the lined, box-shaped recess. The pole shoes are made of a ferromagnetic material which is capable of guiding and strengthening magnetic field lines well. The pole shoes are therefore made of a material with a relative magnetic permeability $\mu_R$ greater than 1. The pole shoes are preferably made of a magnetic material such as Hyperm 900. Hyperm 900 is the trade name for a ferromagnetic material containing 70–80% nickel which attains a maximum relative permeability of 180,000. In the embodiment, the pole shoes are made of a commercially available, constructional steel with a typical relative permeability of 2,000. An oblong bar magnet 9 is arranged between the pole shoes 8. The bar magnet is a permanent magnet and preferably made of a magnetically hard material with a high coercive force. In the embodiment, the bar magnet was made of an NdFeB bar magnet (neodymium-iron-boron bar magnet). However, other magnetically hard materials are conceivable for the bar magnet. It is important that the materials are capable of forming a strong magnetic field (magnetic permeability very large compared to 1) and that the strong magnetic field can be sustained against pole reversal or weakening (high coercive force).

The two pole shoes 8 and the permanent magnet 9 form a U-shaped arrangement in the lined, box-shaped recess, in which the two pole shoes 8 form the legs of the U-shaped arrangement and the permanent magnet 9 the yoke of the U-shaped arrangement. This U-shaped magnet arrangement is arranged in the recess 3 in such a manner that the permanent magnet 9 lies on the bottom 5 of the recess so that the legs of the U-shaped arrangement point toward the face 2 of the shaft end. In this way, there remains an empty free space 3a, which is also box-shaped, in the recess 3. A fixed, commercially available magnetic field sensor 10, which is capable of detecting a change in direction of the magnetic field between the two pole shoes 8, is arranged in this free space 3a. Various so-called magnetic angle of rotation sensors can be used for this purpose. The magnetic field sensor 10 is immovably fixed to a holder 11. On this holder 11 there is also an electronic unit E for supplying power to the actual sensor and for evaluating the sensor signals as well as converting them into an angle of rotation $\Phi$ as a measure of the angle of rotation of the mechanical shaft 1 compared to the magnetic field sensor 10 and the holder 11. Preferably, the electronic unit E has a digital output 12 which is shown diagrammatically as a double arrow in FIG. 1. At the output 12, the angle of rotation is made available for further processing by, for example, a subsequent display device, or a control device or other data processing depending upon the intended application. In the embodiment, a commercially available Hall sensor, as manufactured by the firm Intermetall for example, was used as a magnetic field sensor.

The individual, previously described components function together as follows. The permanent magnet 9 acts as an angle position transducer which is integrated into the mechanical shaft 1 with very little expenditure and without impairing the loading capacity of the mechanical shaft The pole shoes 8 form the magnetic field of the permanent magnet in such a way that a locally narrowly limited magnetic field with good homogeneity and, ideally, uniform parallelly aligned field lines is created between the two pole shoes in the free space 3a. This magnet arrangement consisting of pole shoes 8 and permanent magnet 9 is enclosed by a non-magnetic sheath made of, for example, 1 mm thick sheet copper. The copper sheathing enables the magnetic field between the pole shoes to retain the strength required for detection. Without this sheathing, the magnetic field lines would already close in the ferromagnetic shaft end 2 so that no field of usable strength and homogeneity would be measurable between the pole shoes. The homogeneity of the field created in this way is considerable.

Figure 2:
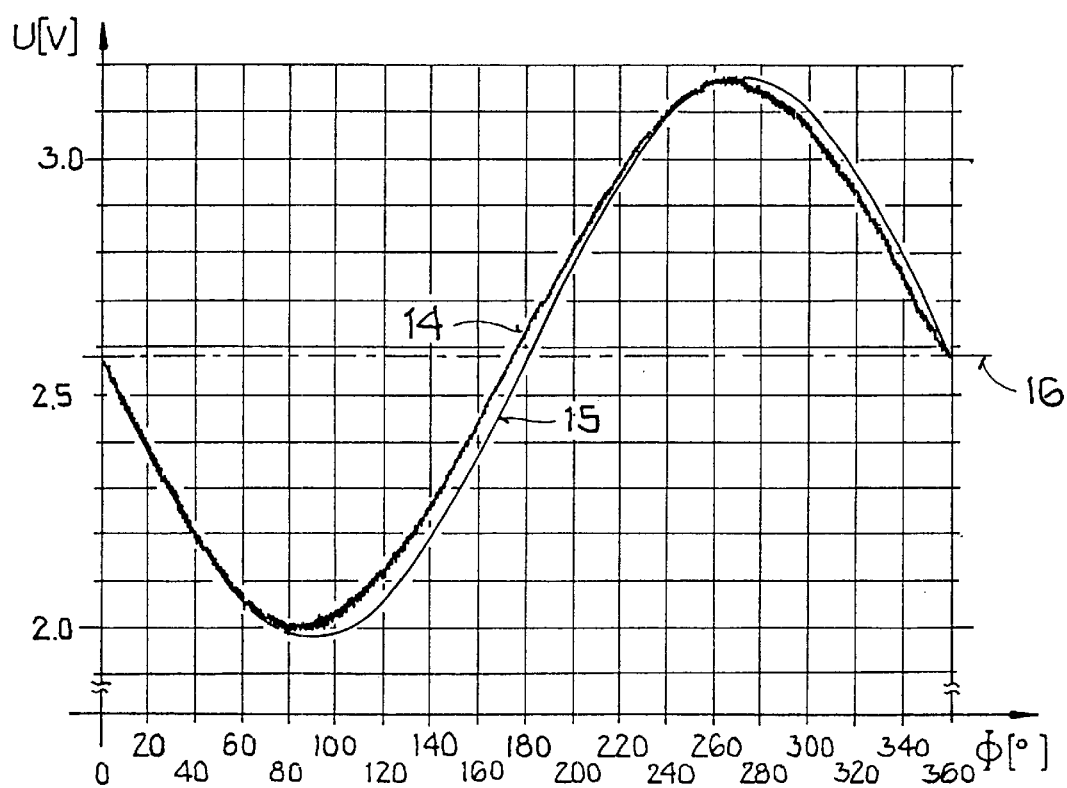

FIG. 2 illustrates a comparison between the signal form actually measured with the arrangement according to the invention and the theoretical signal form. If the magnetic field was ideally uniform, an ideal sinus should be measured during one revolution of the shaft through a round angle of 360°. The actual signal form, which is insignificantly contaminated with noise, of the Hall sensor used is indicated by the number 14 and protracted via the angle of rotation $\Phi$ in the unit °. The Hall voltage of the Hall sensor is protracted in the unit volt (V). The so-called zero induction voltage, which was set to 2.6 V for the magnetic field sensory system used, is shown in the diagram by the dotted line 16. In order to be able to better assess the excellent quality of the signal form 14 measured with the magnet arrangement according to the invention, an ideal, calculated sinus curve 15 is shown in the diagram to represent the ideally possible signal form. There is excellent correspondence between the actual signal form and the ideally possible signal form.

A copper sheathing is not required when using less heavily loaded shafts made of non-magnetic materials. The rest of the design remains identical with the design shown in FIG. 1.

FIG. 3 shows, once again for further explanation, a mechanical shaft end 1 according to the invention without the sensor arrangement shown in FIG. 1. However, with the homogeneous magnetic field H symbolically depicted by arrows between the pole shoes 8. In addition, a partial view A is shown as a plan view of the face of the shaft end. In the plan view, the non-magnetic sheathing 7 of the box-shaped recess in the shaft end is shown again for clarification.

Figure 4:
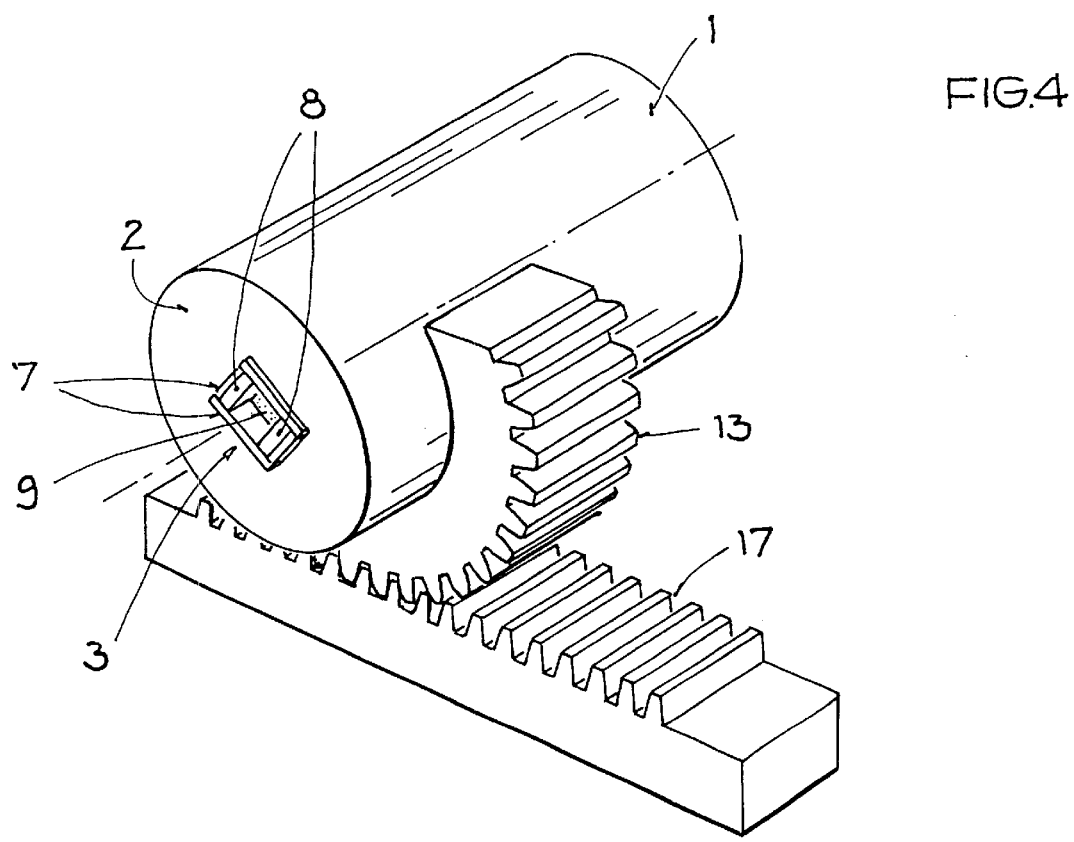
FIG. 4 a possible application of the shaft according to the invention in a gear drive, for example as steering gear in a motor vehicle.

FIG. 4 shows an example of a possible application of the mechanical shaft according to the invention with an integrated magnet arrangement. The arrangement has to be completed by the magnetic field sensory system together with its associated holder shown in FIG. 1. The magnetic field sensor system and the associated holder have been omitted from FIG. 4 for reasons of clarity. A basic module for mechanical power transmission, as shown by the example in FIG. 4, illustrates the many application possibilities of a mechanical shaft with integrated magnetic field arrangement and associated angle of rotation sensor system.

Figure 3:
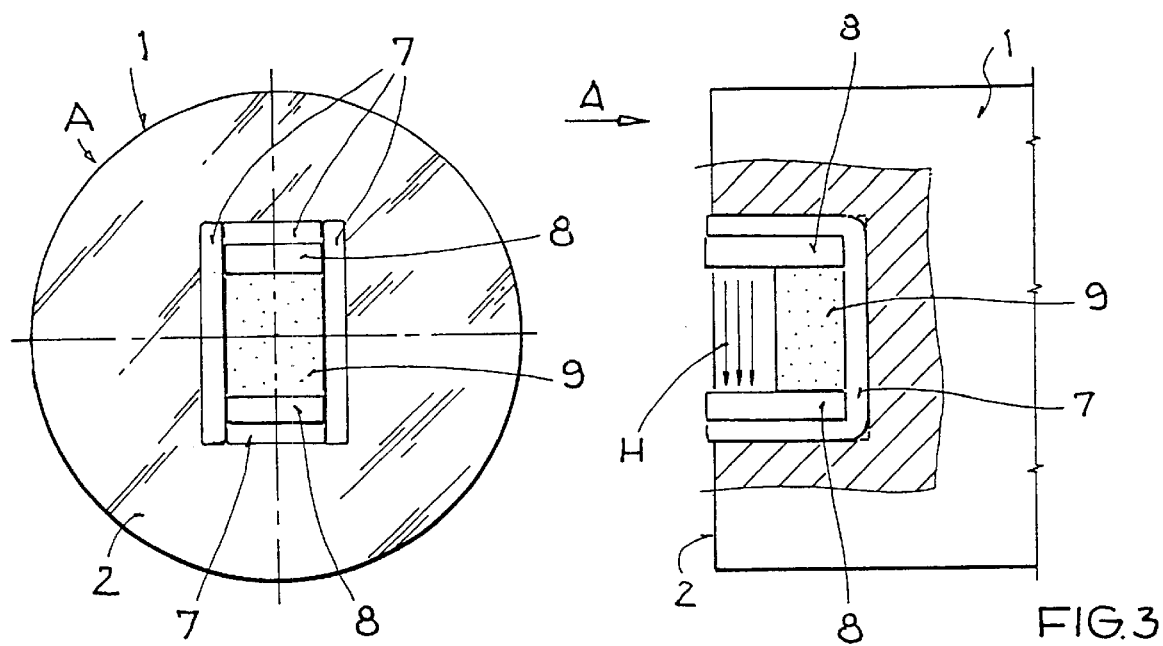

FIG. 4 shows a basic module for mechanical power transmission from a mechanical shaft 1 in which a magnet arrangement 8, 9, as shown in FIGS. 1 and 3, comprising pole shoes 8 and permanent magnet 9 is mounted in a recess 3 in the face 2 of one of the shaft ends. In addition, at least one toothed wheel segment 13 is attached to the shaft, which is in a drive coupling with at least one further toothed segment 17. If the shaft 1 is turned by, for example, a motor then the rotational movement is transmitted by the toothed wheel segment 13 to the toothed segment 17 and also effects a movement there. If the toothed segment 17 is realized as a toothed rack and the toothed wheel segment 13 is realized as a complete toothed wheel, then a rotational movement of the mechanical shaft 1 can be converted into a linear movement of the toothed rack by such a basic module. With simultaneous detection of the angle of rotation, the displacement distance of the toothed rack can thus be determined from the rotational movement of the mechanical shaft if the transmission ratio of the gear drive is known. Together with the magnetic field sensor system shown in FIG. 1, the basic module thus provides a controllable and/or adjustable mechatronic element. For this, it simply requires a controllable, conventional electric motor which controls the mechanical shaft as a function of a control signal and regulates it according to the angle of rotation detected according to the invention. Applications for the mechanical shaft with integrated magnet arrangement and for the basic module shown in FIG. 4 occur, for example, in motor vehicles in so-called drive-by-wire systems in which the mechanical steering gear is replaced by intelligent, electromechanical actuators.

What is claimed is:

1. Mechanical shaft (1) with integrated magnet arrangement (8,9) for detecting the angle of rotation of the shaft (1) around its axis of rotation, with
    a) a box-shaped recess (3) in the face (2) of the mechanical shaft (1),
    b) an oblong permanent magnet (9) which is arranged on the bottom (5) of the recess (3),
    c) two pole shoes (8) which are arranged on opposite sides (4) of the box-shaped recess (3) at the poles of the oblong permanent magnet (9) and which have a positive flush fit with the face (2) of the mechanical shaft (1),
    d) in which the two pole shoes (8) form a U-shaped magnet arrangement (8, 9) with the oblong permanent magnet (9), in which the pole shoes (8) form the two legs and the oblong permanent magnet (9) forms the yoke of the U-shaped magnet arrangement,
    e) so that a free space (3a) remains in the recess (3) between the pole shoes (8), in which a uniform, homogeneous magnetic field (H) with parallel lines of force prevails.

2. Product according to claim 1 wherein an additional non-magnetic screening (7) is arranged in the recess which screens the magnet arrangement (8, 9) from the mechanical shaft (1).

3. Basic module for mechanical power transmission with a mechanical shaft (1) according to claim 1 or 2 to which at least one toothed wheel segment (13) is attached, which is in a drive coupling with one toothed segment (17).

4. Basic module according to claim 3 wherein the toothed wheel segment (13) is formed as a complete toothed wheel.

5. Basic module according to claim 3 wherein the toothed segment (17) is formed as a toothed rack.

6. Arrangement for detecting the angle of rotation of a mechanical shaft (1) of a basic module according claim 3 with
    a) at least one magnetic field sensor (10) which is immovably fixed to a holder (11) and projects into the free space (3a),
    b) with an electronic unit (E) which is connected to the magnetic field sensor (10) and which supplies the magnetic field sensor with energy and which detects the sensor signals of the magnetic field sensor and converts them into an angle of rotation ($\Phi$) as a measure for the angle of rotation of the mechanical shaft (1) compared to the magnetic field sensor (10).

7. Arrangement for detecting the angle of rotation of a mechanical shaft (1) according to claim 1 or 2 with
    a) at least one magnetic filed sensor (10) which is immovably fixed to a holder (11) and projects into the free space (3a),
    b) with an electronic unit (E) which is connected to the magnetic field sensor (10) and which supplies the magnetic field sensor with energy and which detects the sensor signals of the magnetic field sensor and converts them into an angle of rotation ($\Phi$)) as a measure for the angle of rotation of the mechanical shaft (1) compared to the magnetic field sensor (10).

8. Arrangement according to claim 6 wherein the magnetic field sensor is a Hall sensor.

9. Use of the arrangement according to claim 6 in an electromechanical actuator.

10. Use of the arrangement according claim 6 in a mechanical steering gear.

* * * * *